Nov. 29, 1927. 1,650,993
J. M. LARSON
REGULATOR FOR HEATING SYSTEMS
Filed Feb. 14, 1925 3 Sheets-Sheet 3

Witness:
W. X. Olson

Inventor:
John M. Larson
By Jones, Addington, Ames & Seibold
Attys.

Patented Nov. 29, 1927.

1,650,993

UNITED STATES PATENT OFFICE.

JOHN M. LARSON, OF CHICAGO, ILLINOIS, ASSIGNOR TO NATIONAL REGULATOR COMPANY, OF CHICAGO, ILLINOIS, A CORPORATION OF ILLINOIS.

REGULATOR FOR HEATING SYSTEMS.

Application filed February 14, 1925. Serial No. 9,314.

This invention relates to regulators for heating systems and particularly to apparatus for collectively controlling a plurality of radiating units such as located in the various rooms of a building.

In buildings such as schoolhouses, it is desirable to uniformly regulate the temperature during the daytime to a normal temperature. Since each room is subject to different temperature conditions, it is also desirable to provide in such heating systems means for locally controlling each of the radiating units to secure a substantially constant normal temperature level in each room, for example, 70°. However, during the night and at other times when the rooms are not in use, the maintenance of the rooms at normal temperature would involve a waste of fuel. To eliminate the necessity of maintaining the rooms at normal temperature when not being used, valve regulating means operated by air pressure have been used—using two air pressures, one for regulation at normal temperatures and the other for subnormal heating.

One object of this invention is to provide regulating apparatus in which the regulating devices are operated by a substantially constant source of fluid pressure, the same pressure range being utilized for both normal and subnormal heating. In accordance with this invention, means are also provided for collectively controlling the regulating devices of the system to not only adjust such devices for either normal or subnormal heating, but also for accurately regulating the heating, both at the normal temperature level, for example, 70°, and at the subnormal level, as, for example, 40°. In accordance with this invention a centrally located control device serves to shift all of the regulating devices from the normal regulated temperature level to the subnormal and regulated level, or vice versa.

With systems as above described, it is also desirable to provide means for heating to normal temperatures certain of the rooms while the remainder of the heating system is maintained at the subnormal temperature level. Hence, in accordance with this invention locally operable means are also provided at each radiating unit for rendering the centrally located control device ineffective in shifting individual regulating devices to the subnormal regulation. Thus, when it is desired to maintain one of the radiating units at the normal temperature after the heating system as a whole has been shifted to the subnormal control, this result can be accomplished by manually operating such locally operable means and without affecting the other radiating units. Furthermore, in accordance with this invention such individual unit is restored to normal condition again or is "self-restoring" when the centrally located control device is operated again to shift the system back to the normal control temperature level.

One of the aims accomplished by this invention is the provision of the above described apparatus in a form such that the control devices on the radiating units are subjected to the full force of the fluid pressure when the rooms are heated to normal temperature. Hence, upon any reduction of the fluid pressure, whether due to injury to the regulating system or to the operation of the regulating devices, the radiator valves will be permitted to open and the heating of the radiating units will be increased. This feature is of importance in cold weather since if the source of fluid pressure becomes cut off or the pressure is reduced, the heating units will be turned on, thus avoiding the possibility of freezing in any part of the building as a result of injury to the regulating apparatus or failure of the fluid pressure supply.

In addition to the above, other objects of this invention comprise the provision of durable regulating apparatus for heating systems which may be installed and maintained at a reasonable cost for providing accurate temperature regulation.

Further objects will become apparent from the following specification and claims, taken in connection with the accompanying drawings, in which—

Figure 1:
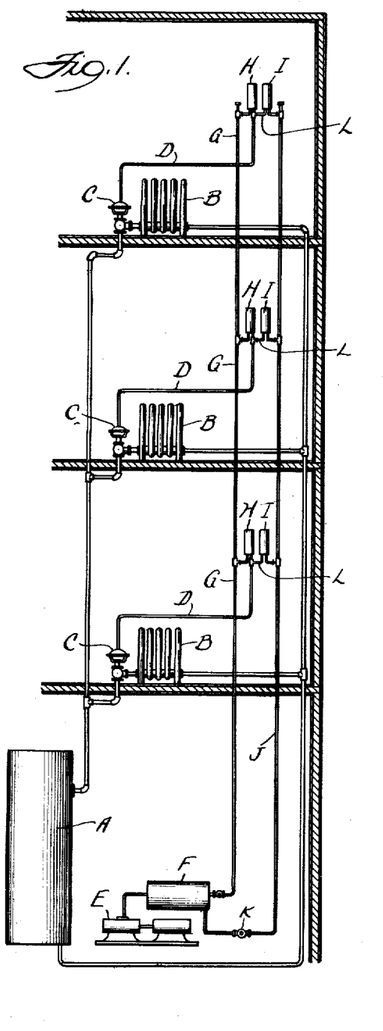
Figure 1 is a schematic illustration of a heating system embodying this invention wherein devices are used for accurately regulating the temperature of each radiating unit at either a normal or a subnormal temperature.

As illustrated in Figure 1, the heating system may comprise a boiler A connected by the usual piping system to radiating units B, the radiation from which may be adjusted by pressure operated diaphragm valves C. The valves C may be of any suitable known construction and may be designed to remain closed during maintenance of normal fluid pressure within control conduits D. Upon reductions of pressure in the control conduits locally of the valves C, the valves are designed to open, permitting steam or other heating medium to be admitted to the radiating units. An air compressor E may be located at a suitable point and is provided with a storage tank F. Suitable conduits G extend to thermostatically operable regulating devices H and I, which serve respectively to control the heating units at either a subnormal or normal temperature level. The control devices H and I are also in communication with the conduits D and with an additional conduit J. The conduit J also extends into communication with the tank F and comprises a part of the "centrally operable means" hereinafter described, by which the control of the system may be shifted from normal to subnormal temperature levels or vice versa. This may be accomplished by the engineer of the building through the operation of a three-way valve K, located in the conduit J. The conduit J during normal temperature regulation is open to the air at the valve K, whereas during subnormal temperature regulation the valve K is adjusted to subject the conduit J to the fluid pressure within the tank F. Conduits L extend between the thermostatic devices H and I.

The valve K is of the three-way type wherein there is a central passageway O establishing communication between the conduit J and the supply tank F. When in the position shown in Figure 9 it establishes sub-normal temperature regulation in the system; and when turned 90° in the direction of the arrow the passageway P will communicate with the conduit J and one leg of the passageway O will communicate with the port S in the casing of the valve while the other leg of the said passageway O will be cut off as will be clear from the drawing. When the valve is in the last named position the air pressure in the conduit J will be exhausted into the atmosphere through the port 8.

Figure 3:
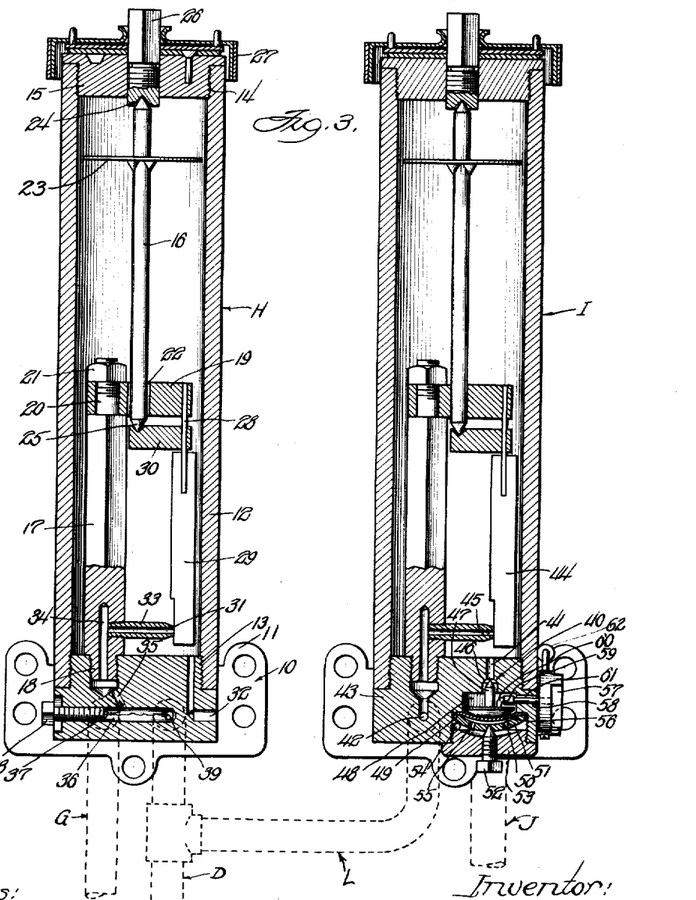
Figure 3 is a sectional view through thermostatically operable devices such as used for regulating each radiating unit at the normal and subnormal temperatures. Such devices may be used in connection with systems as shown in Figure 1.
Figure 4:
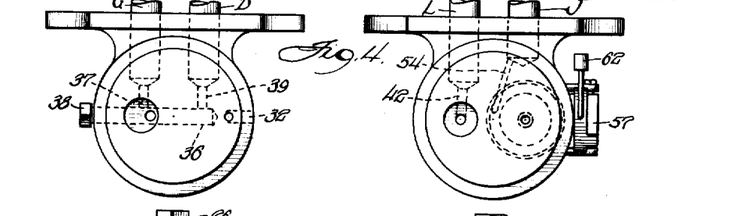
Figure 4 is a top view of the devices such as shown in Figure 3, certain parts being removed.

The construction and operation of the thermostatic control devices H and I will now be described in detail. The device H may comprise a base member 10 provided with suitable mounting lugs 11. A cylindrical casing 12 may be threaded as at 13 upon the base member 10 and threaded as at 14 to receive a suitable plug member 15. Within the cylindrical casing 12 a thermostatic rod 16 may be mounted. The length of the cylindrical casing is designed to vary in respect to the length of the rod 16 upon the occurrence of temperature changes. The lower end of the rod 16 may be retained by means of a suitable post 17 which may be threaded at 18 into the base member 10.

At the upper end of the post 17 an arm 19 may be fastened by means of a lug 20 and nut 21. The arm 19 is provided with an opening at 22 to permit the rod 16 to pass therethrough. Intermediate its ends the rod 16 may be provided with a disc as at 23 for holding the rod in substantially a central position within the casing to facilitate assembly of the parts and to prevent unintended dislocation of the rod 16. The upper and lower ends of the rod 16 may be sharpened to form bearing points 24 and 25, respectively. The point 24 may be received in the lower end of an adjusting screw 26 which in turn is threaded into the plug member 15. A suitable dial member 27 may be fixed in respect to the adjusting screw 26. The dial 27 may be provided with graduations indicating temperatures at which the thermostatic device is adjusted to operate. A spring member 28 may be mounted at the end of the arm 19 for supporting a valve member 29 and a lug member 30. The lug member 30 as shown is attached at one end to the spring member 28 while its other end serves to support the lower point 25 of the thermostat rod 16. It will thus be seen that upon contraction of the casing member in respect to the rod 16 the valve member 29 will be forced to the right, viewing the device as shown in the drawings. The parts are designed so that this will occur upon a drop in temperature.

The valve member 29 normally serves to close an exhaust aperture 31 which is in communication with the source of fluid pressure in a manner to be hereinafter described. Accordingly, upon a movement to the right of the valve member 29 the pressure medium will be exhausted through the aperture 31 into the casing 12. From the casing 12 exhaust to the atmosphere is permitted through a passageway 32.

The aperture 31 is formed in a nipple member 33 which may be screw-threaded into the post 17 as shown and with its central opening in communication with a central opening 34 in the post 17. The opening 34 in turn communicates with an opening 35 in the base member 10, while the opening 35 communicates with a reducing valve chamber 36. The fluid pressure from the conduit G is led to an aperture 37, the size of which may be determined by an adjustable screw 38. The escape of the pressure medium through the apertures 31 and 32 may be adjusted accurately by means of the screw 38.

From the reducing valve chamber 36 a passageway 39 leads to the conduits D and L. Accordingly, the adjustable screw 38 limits not only the quantity of fluid which can in any event escape through the exhaust aperture 31 but also limits the quantity of fluid admissible to the conduits D and L. Thus, the single adjustable valve member 38 may cooperate with either of the thermostatic devices, H or I, depending upon which of the two is being operated.

From the above description it will be seen that the function of the thermostatic device H, briefly stated, is to provide means for exhausting to a predetermined extent, (depending upon the adjusting of the reducing valve 38), the fluid pressure prevailing locally at the radiator valves C and within the conduits D upon a drop in temperature sufficient to warrant opening of the radiator valves C. The exhaust of fluid pressure through the apertures 31 and 32 serves to reduce the pressure locally within the conduit D sufficiently to allow the radiator valves C to open and to permit entrance to the radiators of the heating medium. As above indicated, the thermostatic device H may be adjusted by turning the stem 26 to permit regulation of the radiating unit to give a subnormal room temperature of, for example, 40°.

Thus far in the description, the functions of the thermostatic device —I— have been ignored, since this device is inactive during the actuation of the device H. The construction and operation of the thermostatic device —I— will now be described in detail.

The device —I— is designed to effect regulation of the radiating units at a normal temperature level, such as 70°. The device —I— is similar in construction to the device H with two exceptions. First, in the device —I—, no adjusting valve corresponding to the member 38 is present, since the valve member 38 provides a reducing valve for both of the devices H and —I—, as above indicated. Second, in the device I, an additional valve member 40 is provided for closing off at predetermined times a passageway 41, which corresponds to the passageway 32 of the device H. Features which are common to the two devices will not be again described except as necessary for a complete disclosure of the invention.

The fluid pressure is admitted to the thermostatic device I. through the conduit G, passageways 37, 36 and 39, conduit L, and a passageway 42 formed within a base member 43. A valve member 44 similar to the valve member 29 previously described is provided for controlling the exhaust of pressure through an aperture 45. The aperture 45 communicates with the passageway 42 through suitable openings, as illustrated.

The valve 40 will now be described in further detail. A valve seat 46 is designed to receive a vertically movable valve member 47. The base member 43 is provided with a chamber 48 for receiving the valve member 47. A shoulder 49 is formed within the chamber 48 and a circular flexible diaphragm 50 is held in engagement with the shoulder by a dome-shaped washer member 51. The washer member is in turn held in position by an adjustable set screw 52 which is threaded through a plug member 53. The plug member 53 may be threaded into the base member, as shown.

The conduit J may communicate fluid pressure to the underside of the diaphragm 50 through a passageway 54 and an opening 55 through the dome-shaped washer member. The valve member 47 may be provided with an enlarged and rounded head portion 56, as illustrated, which rests against the diaphragm 50. The diaphragm 50 is formed to permit the valve to remain in open condition when no fluid pressure is maintained under the diaphragm. However, when fluid pressure is admitted to the conduit J by manipulating the engineer's valve K, the diaphragm 50, together with the valve member 47, are forced upwardly, thus closing the valve 40. Thereafter, any exhaust from the aperture 45 will be retained within the casing of the device I, and the device as a whole will be prevented from functioning as a regulator for the radiating units until the valve 40 is again opened.

It will be understood that the valve K may be turned to admit fluid pressure to the conduit J when it is desired to secure regulation of the entire system at a subnormal temperature level. While it may be desired to retain the larger part of the building at the subnormal temperature, at such times individuals may desire the normal temperature in certain of the rooms. To fulfill this desire, manually operable means are provided for locally opening the valve 40 even when the engineer's valve K is turned and pressure is maintained in the conduit J. Such means may take the form of a wrench-engaging member (or operating button) as at 57, which is mounted upon a shaft 58 journaled within the base member 43 and extending into the chamber 48. Within the chamber 48 a collar 59 is provided for fixing the shaft in position. The shaft may be terminated in a cam member 60 for engaging the upper face of the head of the valve member 56.

Thus it will be seen that the operating button or wrench-engaging member 57 may be turned and the cam member 60 will brush against the head of the valve member and force this member downwardly against the action of the fluid pressure upon the diaphragm 50. The upward pressure of the fluid upon the diaphragm, however, will be sufficient to retain the cam member 60 in frictional engagement with the head of the valve member. Thus, when the thumb button 57 is turned as above described, the valve member 40 may be opened to permit exhaust fluid from the aperture 45 to escape through the chamber 48 and thence through a suitable passageway as at 61 to the atmosphere. Hence, when the heating system as a whole is shifted to obtain temperature regulation at the subnormal level, the action of the centrally operable valve K may be rendered ineffective for desired individual heating units and such units may be restored to normal temperature regulation. However, when the engineer's valve K is turned to shift the regulation back to the normal temperature level the pressure on the underside of diaphragm 50 will be released and the cam member 60 will no longer secure frictional engagement with the head of the valve member 56. A counterweight 62 is provided upon the operating button 57 for restoring such button and the cam 60 to normal position as soon as the above described frictional engagement is released. Consequently, the operating button 57 and the parts movable therewith automatically "re-set" themselves without further attention from the operator.

The operation of the system of Figure 1 as a whole will now be summarized. Assuming that the radiating units B have been heated to secure a normal temperature and the valves C are closed, the conduit J must then be open to the atmosphere through the three-way valve K while normal fluid pressure prevails within the conduits G, L and D for holding closed the valves C. However, when the temperature in any of the rooms tends to fall below normal, the valve member 44 of the thermostatic device I of that room will be moved to the right, thus permitting escape of fluid through the aperture 45. The valve 40 being open, such fluid will also escape to the atmosphere through passageways 41 and 61. The rate at which such fluid escapes will be limited and determined by the adjustment of the valve member 38. The adjustment should be such that the fluid pressure locally within the conduits L and D will be decreased sufficiently to permit the corresponding valve C to open. Thereupon the radiating unit will restore the room temperature to normal and the apparatus will be restored to its former condition. The above serves to describe the regulating process at normal temperatures.

At other times when it is unnecessary to maintain the whole building at normal temperature the valve K is operated to admit the fluid pressure to conduits J, which results in closing the valves 40 throughout the system. Thereafter escape of fluid from the apertures 45 to the atmosphere is prevented and regulation of the heating units by the thermostatic devices I is terminated. The valves C therefore will be kept closed until the room temperatures drop to the subnormal level. When the subnormal temperature level is reached the valve members 29 of the thermostatic devices H will then move to the right, permitting the escape of fluid through the apertures 31 and thence to the atmosphere through passageways 32. The amount of fluid thus escaping will in this case also be limited and determined by the adjustment of the valve member 38 and should be sufficient to locally decrease the pressure within the conduits D and L so that the valves C will open permitting the radiator units to be again heated. As soon as the room temperatures are restored to the subnormal level, the thermostatically operated valve members 29 will move to the left closing off the apertures 31. The fluid pressure within the conduits D and L will then be restored to normal thus causing the valves C to become closed again. In this manner the temperature in all of the rooms will be regulated at the subnormal level. It should be particularly noted that the apparatus as above described permits accurate temperature regulation at both the normal and subnormal levels. The operation and purpose of the valves 40 have already been fully described.

The system as disclosed in Figures 2, 5 and 6 will now be described. In this system a boiler A', radiating units B' and valves C' are provided, as in the system above described. A source of fluid pressure E', a reservoir F' and conduits G', D' and J' are also provided, as in the system of Figure 1. Furthermore, a valve K' for controlling the admission of fluid pressure to the conduit J' is used. However, a single thermostatically operated device M is provided at each radiator unit in the form illustrated in Figure 5.

Figures 5, 6, 7, 8, 9:
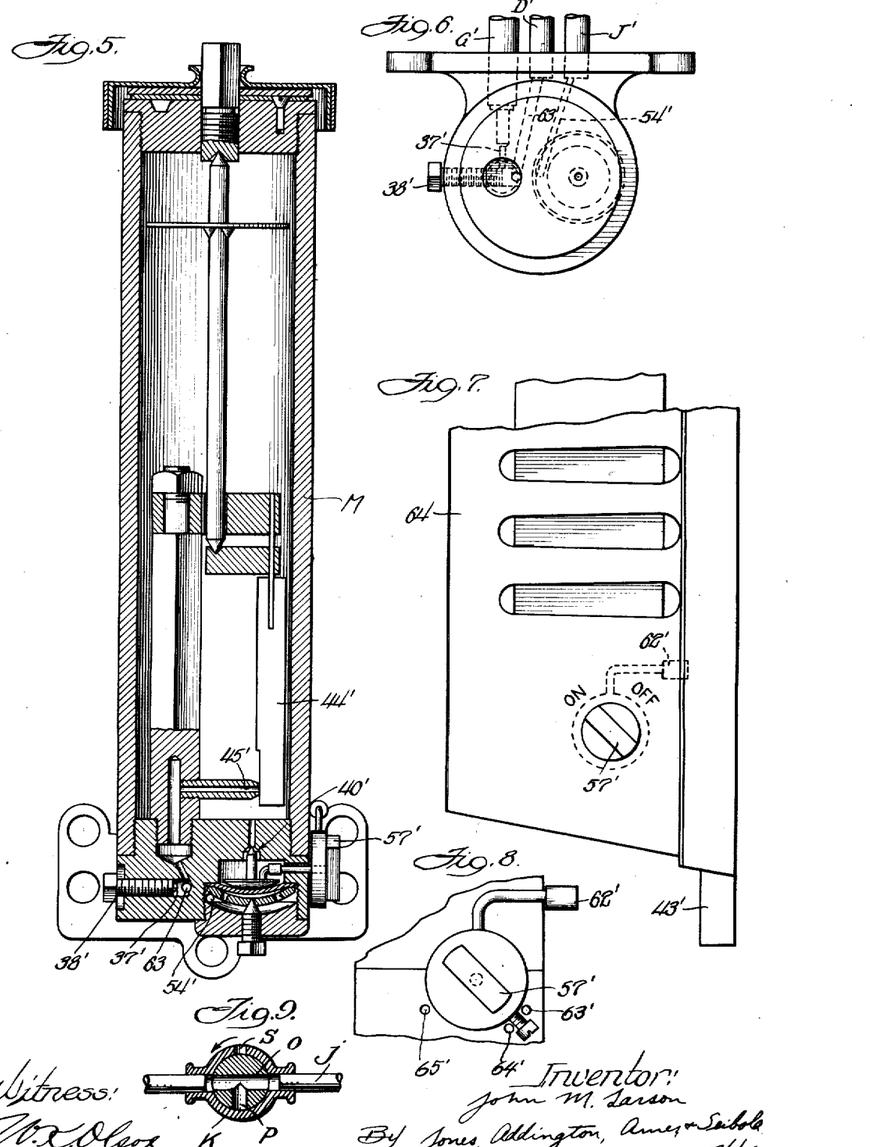
Figure 5 is a sectional view of a thermostatic control device for accurately regulating the radiators at the normal temperature only. Such a device may be used in connection with the system of Figure 2.
Figure 6 is a top view, certain parts being removed, of the device of Figure 5.
Figure 7 is a side elevational view, partly broken away, of a device as shown in Figure 5, as enclosed in a protective casing.
Figure 8 is a detailed elevational view of a portion of Figure 5.
Figure 9 is a sectional view of the manually controlled valve which is centrally located and is used for establishing normal and sub-normal temperature regulation.

The device M, as in Figure 5, is similar in construction to the device I of Figure 3. However, the device M is not intended for use with a subnormal thermostatic regulating device and, accordingly, a reducing valve member 38' is provided within the device M itself. Corresponding parts in the devices I and M are designated on the drawings by corresponding numerals and prime numerals, respectively. The conduits D' to the radiating unit valves are in direct communication through passageways 63 with the chamber at the reducing valves 38'. The conduit G' is in communication with such chamber through the adjustable opening 37'. The conduit J' communicates with the diaphragm chamber of valves 40' through passageways 54'.

Figure 2:
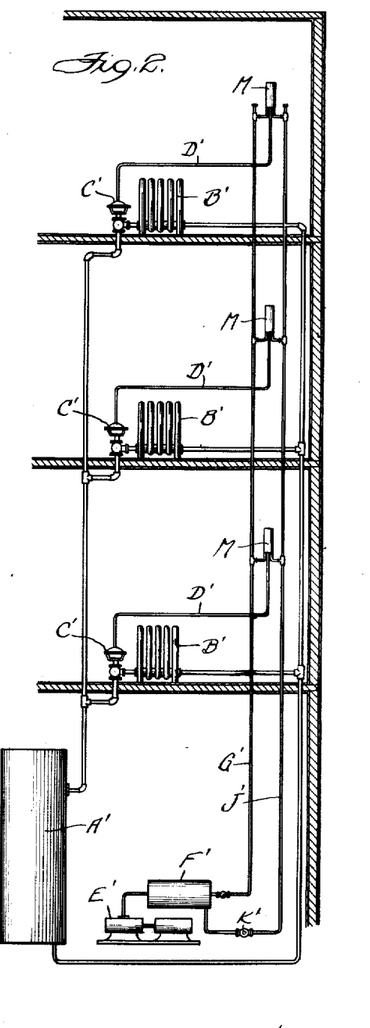
Figure 2 illustrates a system similar to that of Figure 1 except that means are provided only for accurately regulating the heating system at the normal temperature level.

In operating the device of Figure 2, the thermostatic regulating devices M may be adjusted so that their valve members 44' will operate and effect normal temperature regulation at, for example, 70°. The manner of operation will be understood from the description of the system of Figure 1 and particularly from the description of thermostatically operated device I. When normal temperature regulation is no longer desired, all of the valves C' may be caused to close and may be kept closed by operating the valve K', which results in the closing of the valves 40', in a manner which will be readily understood. Individual rooms, however, may be restored to regulated normal temperature by turning the operating button 57'. The remainder of the heating system will be kept cold until the valve K' is again turned to shift the system to normal temperature regulation.

As shown in Figure 8, a stop pin 63' may be provided for limiting the rotational movement in one direction of the thumb button 57'. The rotational movement may also be limited in the other direction by a similar pin inserted in openings 65'. This latter pin may also be removable and may be inserted in an opening 64', in which position it cooperates with the screw 66' in locking the thumb button in the normal heat regulating position. Similar stop pins may be provided upon the thermostatic device I.

As shown in Figure 7, a protective and decorative casing as at 64 of sheet metal or other material may be provided for the regulating devices H, I or M.

While several embodiments of the invention have been herein described in detail, it is to be understood that only such limitations are to be placed upon the invention as may be required by the prior art and as are set forth in the appended claims.

Having thus described my invention, what I claim as new and desire to secure by Letters Patent of the United States is:

1. In a heating system, a plurality of radiating units each having valves for adjusting the flow of the heating medium thereto, a source of fluid pressure operatively connected to said valves and serving to retain said valves closed during maintenance of normal pressure, thermostatically controlled means for each radiating unit for locally exhausting fluid pressure to permit said valves to open when the temperature falls, thus providing regulation of the heating, and means operated from a central point for closing off the exhausting fluid pressure to prevent such regulation at desired times.

2. In a heating system, a plurality of radiating units each having valves for adjusting the flow of the heating medium thereto, a source of fluid pressure operatively connected to said valves and serving to retain said valves closed during maintenance of normal pressure, thermostatically controlled means for each radiating unit for locally exhausting fluid pressure to permit said valves to open when the temperature falls, thus providing regulation of the heating, means operated from a central point for closing off such exhausting fluid pressure to prevent such regulation when desired, and manually operable means local to each radiating unit for restoring regulation to desired individual units by rendering said centrally operable means ineffective for such units.

3. In a heating system, a plurality of radiating units each having valves for adjusting the flow of the heating medium thereto, a source of fluid pressure for operating said valves, a plurality of thermostatically controlled means for each radiating unit for exhausting fluid pressure locally at each unit for effecting regulation of each unit individually at a plurality of temperature levels, and means operable from a single point for closing off the exhausting fluid pressure thus rendering certain of the exhausting means ineffective, thereby determining the temperature level at which the system is collectively regulated.

4. In a heating system, a plurality of radiating units each having valves for adjusting the flow of the heating medium thereto, a source of fluid pressure common to all of said units, each heating unit also having thermostatically operated valves for locally exhausting the fluid pressure at such unit thereby regulating the heating at any of a plurality of predetermined temperature levels, and centrally operable means closing off the exhausting fluid pressure for rendering ineffective the thermostatically operated valves except those manually set for regulating temperature at a desired level.

5. In a heating system, a plurality of radiating units each having valves for adjusting the flow of the heating medium thereto, a source of fluid pressure operatively connected to said valves and serving to retain said valves closed during maintenance of normal pressure, thermostatically controlled means for each radiating unit for locally exhausting fluid pressure to permit said valves to open when the temperature falls for effecting heat regulation, means operated from a central point for closing off such exhausting fluid pressure to prevent such regulation when normal heating is unnecessary, manually operable means local to each radiating unit for restoring regulation to desired individual units by rendering said centrally operable means ineffective for such units, said manually operable means being normally self-restoring upon the restoration of said centrally operable means, and locking means to prevent such restoration of the manually operable means when desired.

6. A thermostatic controller comprising a sealed thermally expansible and contractible chamber, a valve positioned within said chamber and means acted upon by the expansion and contraction of said chamber to effect corresponding adjustments of said valve, a member forming one wall of said chamber, a fluid-pressure inlet-duct in said member terminating in an outlet-port controlled by said valve, an outlet-duct in said member connecting the interior of said chamber with the outer air, and a fluid-pressure operable valve controlling said outlet-duct.

7. A thermostatic controller comprising a sealed thermally expansible and contractible chamber, a valve positioned within said chamber and means acted upon by the expansion and contraction of said chamber to effect corresponding adjustments of said valve, a member forming one wall of said chamber, a fluid-pressure inlet-duct in said member terminating in an outlet-port controlled by said valve, an outlet-duct in said member connecting the interior of said chamber with the outer air, a chamber in said member, and a fluid-pressure operable valve therein controlling said outlet-duct and removable as a unit.

8. In a heating system, a plurality of heating units each having a heat medium admission valve, a source of fluid pressure for operating said valves, means for locally regulating the heating of each unit by exhausting fluid pressure to obtain normal temperature throughout the system, and centrally operable means closing off the exhausting fluid pressure for altering the various local regulating means of the system to effect local regulation of each unit at sub-normal temperature.

9. In a heating system, a plurality of heating units each having a heat medium admission valve, a source of fluid pressure for operating said valves, means for locally regulating the heating of each unit by exhausting fluid pressure to obtain normal temperature throughout the system, centrally operable means closing off the exhausting fluid pressure for altering the various local regulating means of the system to effect local regulation of each unit at sub-normal temperatures, and manually operable means at each unit for locally restoring desired units to the normal temperature regulation.

10. In a heating system, a plurality of heating units each having a heat medium admission valve, a source of fluid pressure for operating said valves, means for locally regulating the heating of each unit by exhausting fluid pressure to obtain normal temperature throughout the system, centrally operable means for altering the various local regulating means of the system to effect local regulation of each unit at sub-normal temperatures, and manually operable means at each unit for locally restoring desired units to the normal temperature regulation until the centrally operable means is restored for normal temperature regulation of the system, such restoring of the system also effecting restoration of said manually operable means.

In witness whereof, I have hereunto subscribed my name.

J. M. LARSON.

off the exhausting fluid pressure for rendering ineffective the thermostatically operated valves except those manually set for regulating temperature at a desired level.

5. In a heating system, a plurality of radiating units each having valves for adjusting the flow of the heating medium thereto, a source of fluid pressure operatively connected to said valves and serving to retain said valves closed during maintenance of normal pressure, thermostatically controlled means for each radiating unit for locally exhausting fluid pressure to permit said valves to open when the temperature falls for effecting heat regulation, means operated from a central point for closing off such exhausting fluid pressure to prevent such regulation when normal heating is unnecessary, manually operable means local to each radiating unit for restoring regulation to desired individual units by rendering said centrally operable means ineffective for such units, said manually operable means being normally self-restoring upon the restoration of said centrally operable means, and locking means to prevent such restoration of the manually operable means when desired.

6. A thermostatic controller comprising a sealed thermally expansible and contractible chamber, a valve positioned within said chamber and means acted upon by the expansion and contraction of said chamber to effect corresponding adjustments of said valve, a member forming one wall of said chamber, a fluid-pressure inlet-duct in said member terminating in an outlet-port controlled by said valve, an outlet-duct in said member connecting the interior of said chamber with the outer air, and a fluid-pressure operable valve controlling said outlet-duct.

7. A thermostatic controller comprising a sealed thermally expansible and contractible chamber, a valve positioned within said chamber and means acted upon by the expansion and contraction of said chamber to effect corresponding adjustments of said valve, a member forming one wall of said chamber, a fluid-pressure inlet-duct in said member terminating in an outlet-port controlled by said valve, an outlet-duct in said member connecting the interior of said chamber with the outer air, a chamber in said member, and a fluid-pressure operable valve therein controlling said outlet-duct and removable as a unit.

8. In a heating system, a plurality of heating units each having a heat medium admission valve, a source of fluid pressure for operating said valves, means for locally regulating the heating of each unit by exhausting fluid pressure to obtain normal temperature throughout the system, and centrally operable means closing off the exhausting fluid pressure for altering the various local regulating means of the system to effect local regulation of each unit at sub-normal temperature.

9. In a heating system, a plurality of heating units each having a heat medium admission valve, a source of fluid pressure for operating said valves, means for locally regulating the heating of each unit by exhausting fluid pressure to obtain normal temperature throughout the system, centrally operable means closing off the exhausting fluid pressure for altering the various local regulating means of the system to effect local regulation of each unit at sub-normal temperatures, and manually operable means at each unit for locally restoring desired units to the normal temperature regulation.

10. In a heating system, a plurality of heating units each having a heat medium admission valve, a source of fluid pressure for operating said valves, means for locally regulating the heating of each unit by exhausting fluid pressure to obtain normal temperature throughout the system, centrally operable means for altering the various local regulating means of the system to effect local regulation of each unit at sub-normal temperatures, and manually operable means at each unit for locally restoring desired units to the normal temperature regulation until the centrally operable means is restored for normal temperature regulation of the system, such restoring of the system also effecting restoration of said manually operable means.

In witness whereof, I have hereunto subscribed my name.

J. M. LARSON.

CERTIFICATE OF CORRECTION.

Patent No. 1,650,993.      Granted November 29, 1927, to

JOHN M. LARSON.

It is hereby certified that error appears in the printed specification of the above numbered patent requiring correction as follows: Page 6, line 55, claim 7, after the word "unit" and before the period insert the word "therefrom"; and that the said Letters Patent should be read with this correction therein that the same may conform to the record of the case in the Patent Office.

Signed and sealed this 31st day of January, A. D. 1928.

M. J. Moore,
Acting Commissioner of Patents.

Seal.

CERTIFICATE OF CORRECTION.

Patent No. 1,650,993.   Granted November 29, 1927, to

JOHN M. LARSON.

It is hereby certified that error appears in the printed specification of the above numbered patent requiring correction as follows: Page 6, line 55, claim 7, after the word "unit" and before the period insert the word "therefrom"; and that the said Letters Patent should be read with this correction therein that the same may conform to the record of the case in the Patent Office.

Signed and sealed this 31st day of January, A. D. 1928.

Seal.

M. J. Moore,
Acting Commissioner of Patents.